United States Patent [19]

Werner et al.

[11] 3,968,335
[45] July 6, 1976

[54] DIAL TONE SPEED MONITOR

[75] Inventors: Leroy H. Werner, Burlington; Ralph I. Nagata, Berlin, both of N.J.

[73] Assignee: Telesciences, Inc., Moorestown, N.J.

[22] Filed: Feb. 3, 1975

[21] Appl. No.: 546,199

[52] U.S. Cl. .......................... 179/175.2 C; 179/8 A; 235/92 PE
[51] Int. Cl.² .......................................... H04M 3/36
[58] Field of Search ............ 179/175.2 C, 8 A, 8 R; 235/92 T, 92 NG, 92 PE

[56] References Cited
UNITED STATES PATENTS

| | | | |
|---|---|---|---|
| 2,981,799 | 4/1961 | Riggen | 179/175.2 R |
| 3,081,031 | 3/1963 | Livesay | 235/92 NG |
| 3,413,452 | 11/1968 | Schlein | 235/92 PE |
| 3,660,604 | 5/1972 | Bruglemans | 179/8 A |
| 3,760,105 | 9/1973 | Puccini | 179/8 A |
| 3,868,480 | 2/1975 | Murgio et al. | 179/8 A |

Primary Examiner—Douglas W. Olms
Attorney, Agent, or Firm—Edelson and Udell

[57] ABSTRACT

Apparatus for connection to the line finder group busy signal leads of telephone office equipment to determine when each line finder group is and is not busy, make an averaging determination of the busy conditions and generate signals indicating this average condition of busy activity on the monitored lines. The apparatus includes a parallel to serial multiplexer for cyclically sequentially sampling the line finder busy signal leads, means for selecting which of the leads are to be sampled, and a divide-by-N counter settable to count a predetermined number of pulses received from the multiplexer equal to the number of leads selected for monitoring, and to generate an output signal after each receipt of such predetermined number of pulses. The timing of the apparatus is so arranged that each generated output signal directly represents a busy time of 0.1% of an hour or 3.6 seconds.

5 Claims, 4 Drawing Figures

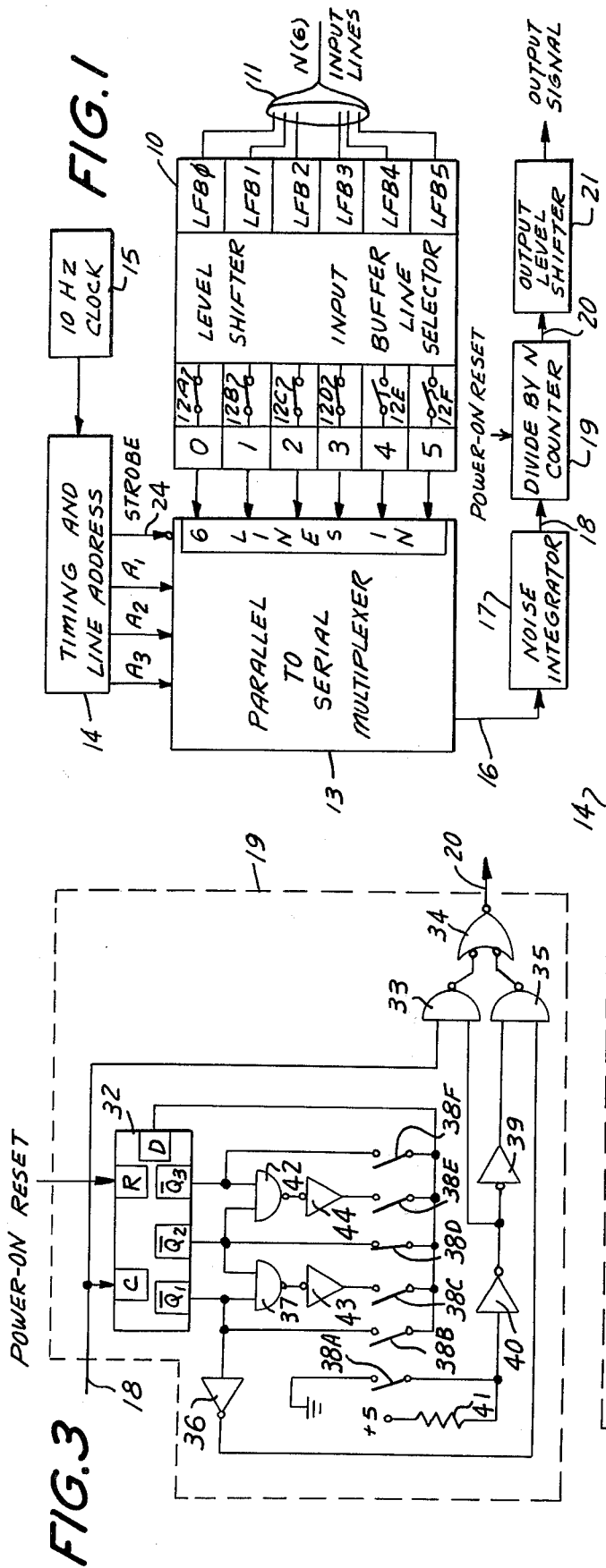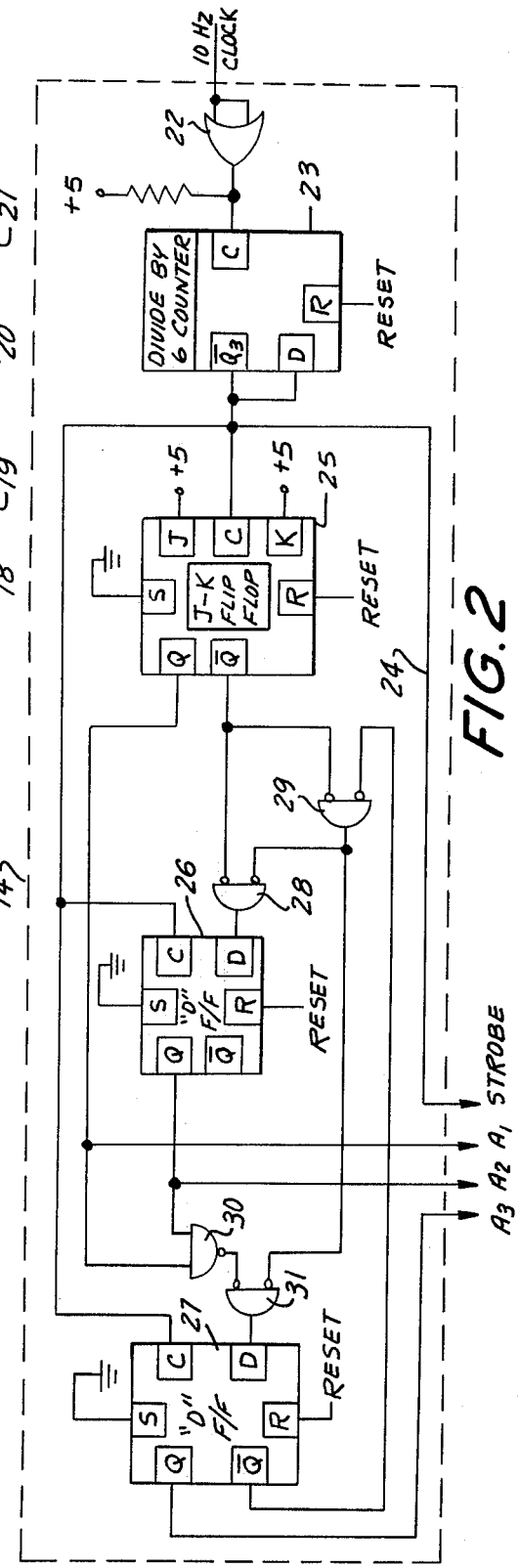

DIAL TONE SPEED MONITOR

This invention relates generally to apparatus for determining the length of time it takes for a telephone subscriber to obtain a dial tone when the instrument is taken off the hook. The telephone system is set up with a large number of different kinds of offices, some of which are called small offices and are the primary places where a customer line goes through in order to obtain a transmission path to the telephone instrument which it is desired to call.

The customer lines terminate initially in equipment called line finders which are pieces of apparatus which upon demand sequentially examine the customer lines for service requests so that the customer line may be connected for routing of the call to the desired called instrument. It is necessary in order to conserve equipment and reduce costs that the number of line finders in an office are far fewer than the number of customer lines coming into the office. That is, it might be for example that a small office could have 2000 customer lines coming into the office and have for example two hundred line finders. Obviously, 2000 customers cannot simultaneously carry on conversations over 2000 line finders. In actuality, this is normally not required because all customer lines are not in use all the time, so a one-to-one correspondence of customer lines to line finders is unnecessary. A 100 customer group will be serviced for example by 10, 100 point line finders, whereas a 200 customer group will be served by 16, 20 or 30, 200 point line finders, depending upon the traffic level expected. Each customer line in the group appears on the switch bank of every line finder in that group.

The number of line finders from an office is hopefully arranged so that when a customer desires to place a call through the office and picks up his telephone instrument, there will be no longer than a certain maximum length of time before that customer's line is connected to a line finder. This depends upon the usage factor through the office. Some offices will require many more line finders than other offices for the same number of customer lines if the condition is not to arise in which an unacceptable length of time passes before a free line is obtainable by a customer.

The apparatus according to this invention samples and determines the usage factor through the office so that it is possible to determine what the average length of time delay in obtaining a line by a customer will be. If this length of time is shown to be unacceptably long, then additional line finders will be required at that office. On the other hand, if substantially a zero delay time is obtained at all times, it may well be that the line finders from that office are being under-utilized so that additional customer lines may be routed into that station, or some of those line finders may be transferred to other stations.

When a customer picks up his telephone to make a call, the first line finder in the group will search for an available outgoing trunk unless that line finder is already busy by having previously connected some other subscriber incoming line to an outgoing trunk. If that is the case, the next line finder in the group, assuming that it is not busy, will start the search for an available trunk. If all of the line finders in the group have already connected customer lines to outgoing trunks, then the customer line which is looking for a trunk will not be able to be connected until such time as one of the now engaged line finders becomes free. In this circumstance, a line finder busy signal is generated indicating that all line finders in that group are in use.

A small office may for example have six line finder groups, and it is important to be able to determine how often, on average, the line finder groups are busy. This can be determined by sampling each line finder group busy signal lead to determine whether or not that group is busy, doing the sampling on a time sequential repetitive basis, and averaging the results obtained to give an indication of the percent of the time that any line finder group, on average, is busy. A convenient time base to utilize for sampling the entire set of line finder group busy signal leads is 3.6 seconds since this is one one-thousandth of an hour and therefore gives a direct percentage reading in terms of one tenth of one percent of an hour. For example, if the office has six line finder groups contained within it, then all six of the line finder group busy signal leads will be sampled each 3.6 seconds on a continuous cycle basis.

The apparatus according to the invention monitors the conditions on the line finder group busy signal leads to determine when each line finder group is busy and when it is not busy, makes an averaging determination of the busy conditions and generates signal which indicate this average condition of busy activity from the leads of the office which are being monitored. The apparatus is so designed that if all line finder groups are busy during a 3.6 second interval, one pulse will be generated at the output of the apparatus. Accordingly, if all line finder groups were busy continuously over a period of an hour, the number of pulses generated, namely one pulse for each 3.6 second interval, would aggregate to 1,000 pulses during that hour and would correspond to a 100% busy condition. Any busy condition other than that will necessarily cause fewer pulses to be generated during the course of an hour, and consequently the percentage of busy time indicated will be less than 100% in proportion to the number of pulses generated.

A primary object of the invention is to provide novel apparatus for monitoring the signal states on a plurality of independent signal lines and to generate signals which indicate the average condition of the signal state on all of the monitored lines.

Another object of the invention is to provide novel apparatus as aforesaid wherein the signal condition on each of the plurality of signal lines is sampled on a time sequential repetitive basis by a parallel to serial multiplexer which produces an intermediate pulse at its output whenever a sampled line is characterized by a particular state, the intermediate pulses so produced being then counted by a counter which generates an output signal after receiving a number of intermediate pulses equal to the number of signal lines being monitored.

A further object of the invention is to provide novel apparatus as aforesaid wherein means are provided for selecting for monitoring any number of the aforesaid plurality of independent signal lines, and means are provided for setting the counter to count a number of intermediate pulses equal in number to the number of signal lines selected for monitoring.

Yet another object of the invention is to provide novel apparatus as aforesaid for monitoring the line finder group busy signal leads of a telephone office in order to determine the usage factor through that office so that it is possible to ascertain what the average length of time delay in obtaining a line will be encountered by a customer.

A still further object of the invention is to provide novel apparatus as aforesaid which monitors the conditions on the line finder group busy signal leads from a telephone office to determine when each line finder group is busy and when it is not busy, makes an averaging determination of the busy conditions and generates signals which indicate this average condition of busy activity from the leads of the telephone office which are being monitored.

The foregoing and other objects of the invention will become clear from a reading of the following specification in conjunction with an examination of the appended drawings, wherein:

FIG. 1 is a functional block diagram of the apparatus according to the invention;

FIG. 2 is an expanded logic diagram of the functional block in FIG. 1 designated as Timing And Line Address;

FIG. 3 is an expanded logic diagram of the functional block shown in FIG. 1 as the Divide By N Counter.

In the several figures, like elements are denoted by like reference numbers.

Figure 4:
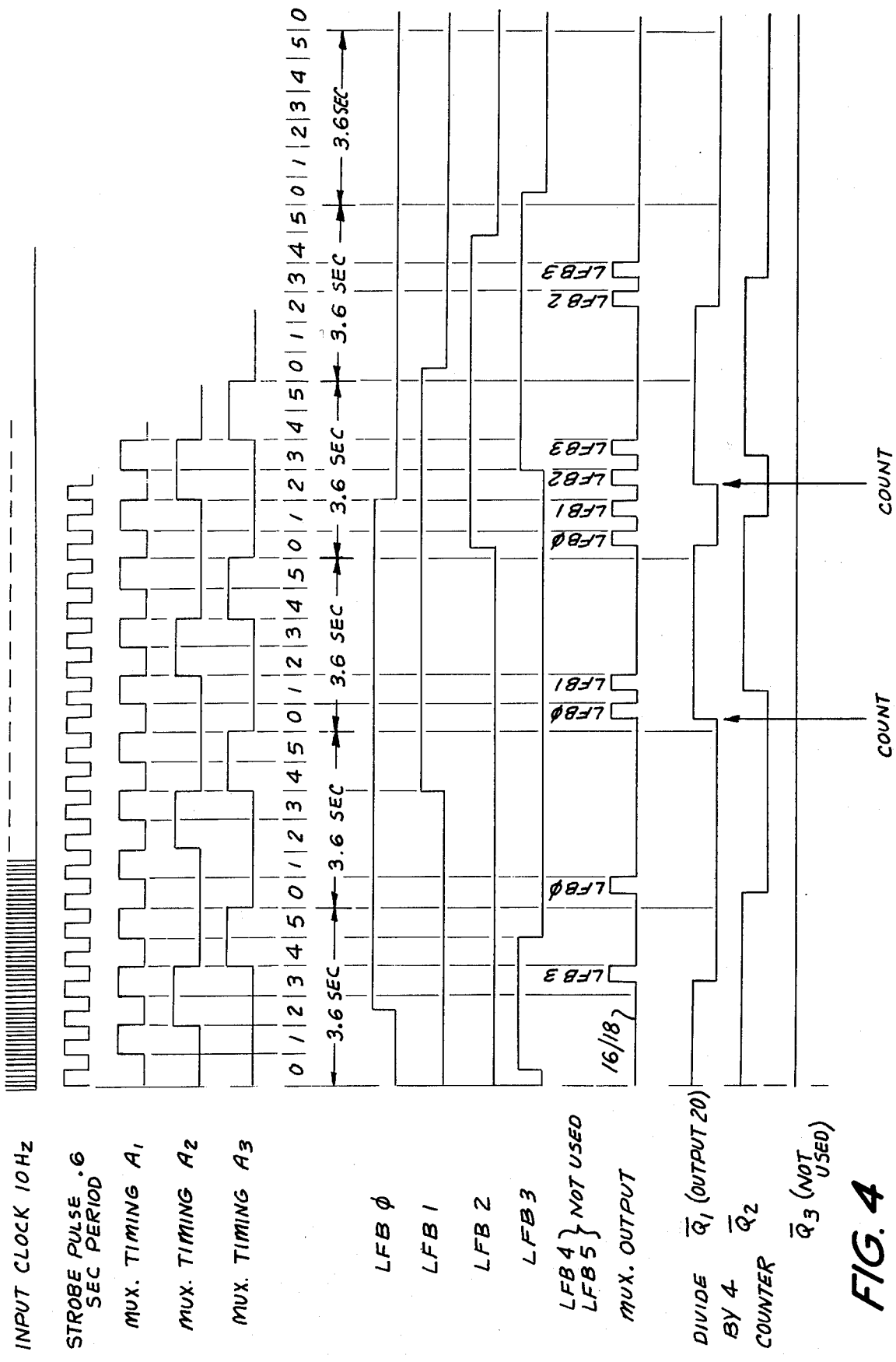
FIG. 4 is a timing diagram showing the timing waveforms and signals present at various parts of the apparatus.

Referring now to the drawings, and first to FIG. 1 and also to the timing diagrams shown in FIG. 4. In FIG. 1 there is observed a Level Shifter And Input Buffer Line Selector 10 having six input connections designated as LFB0 through LFB5, to each of which is connected one of the line finder group busy signal leads from the previously mentioned six line finder groups of the small office, these lines coming in through a cable designated generally as 11. The signal levels on the line finder group busy signal leads are adjusted in the Level Shifter to levels suitable for use with logic circuits, and are connected through a series of switches 12A through 12F to six input lines of a Parallel to Serial Multiplexer 13.

As shown in FIG. 1, the switches 12A through 12D are closed, while the switches 12E and 12F are open so that signals on the lines controlled by switches 12A through 12D will be taken into account in the averaging operation of the apparatus while signals on the lines controlled by switches 12E and 12F will be discarded. This is shown in the waveforms of FIG. 4 wherein signals for each of line finder group busy signal lines 0 through 3 are shown, while there are no signals shown for line finder group busy signal leads 4 and 5. The time multiplexing signals for the Multiplexer 13 are generated by the Timing And Line Address block 14, which in turn generates its signals based upon signals received from a 10 Hertz Clock 15.

The signals on the input lines to the Multiplexer 13 are sequentially examined under control of the address signals from the Timing And Line Address block 14 and appear sequentially on output line 16 from the Multiplexer, passing through a Noise Integrator 17 which cleans up the signal pulses so that they appear generally as shown on the Multiplexer output waveform line 16/18 of FIG. 4. The Multiplexer output signals, after passing through the Noise Integrator 17 are presented via signal line 18 to a Divide By N Counter 19 which generates an output signal on line 20 each time that the Counter has received N input pulses.

In the illustrated case, since only four line finder group busy signal leads are being examined, namely lines LFB0 through LFB3, the Divide By N Counter is settable, and is set, so that it will cause a divide-by-four operation to occur and generate an output signal each time it has received four pulses. The output signal is shown in FIG. 4 as the signal on the line designated as $\overline{Q}1$ (OUTPUT 20). The output signal is then passed through an Output Level Shifter 21 which converts the signal level from logic level to a level suitable for use with whatever monitoring equipment will receive the signal from the apparatus according to the invention.

Referring now to FIG. 2 in conjunction with the timing waveforms of FIG. 4 it is observed that the 10 Hertz Clock pulses from Clock 15 are routed through an "or" gate 22 buffer connected, and passed to the clock input C of Divide By Six Counter 23. Typically, the Divide by Six Counter 23 could be an RCA integrated circuit chip type CD4018. This integrated circuit has other output terminals designated as $\overline{Q}1$ and $\overline{Q}2$, but these terminals are not used in the present application. In the connection as shown, a pulse is generated at the $\overline{Q}3$ terminal once for each six pulses received at the clock input terminal.

This $\overline{Q}3$ signal is routed to the 6 Lines In section of the Multiplexer via line 24 as a stroke pulse which causes the data on the line finder group busy signal line which has been selected by the selection signal lines A1, A2 and A3 to be passed through the Multiplexer to the output line 16. If a signal is present on the particular line which has been selected, the signal which appears at the output of the Multiplexer 13 on line 16 is in fact the strobe pulse and is shown in FIG. 4 on the line also identified as line 16/18. The $\overline{Q}3$ signal from Counter 23 is also routed to the clock inputs C of JK Flip Flop 25 and flip flops 26 and 27, all of which three flip flops together constitute a second Divide By Six Counter. The flip flop 25 could be for example an RCA type CD 4027 integrated circuit chip while each of the flip flops 26 and 27 could be for example an RCA type 4013 "D" type flip flop.

This first pulse from Counter 23 into the clock inputs of flip flops 25, 26 and 27 causes flip flop 25 to shift to its Q state and generate the A1 high condition while the A2 and A3 lines remain low. When the next $\overline{Q}3$ pulse is generated by Counter 23, flip flop 25 is flipped back to its $\overline{Q}$ state causing the A1 signal to go low. When the flip flop 25 Q output went high to generate the A1 pulse, the $\overline{Q}$ output went low thereby causing a high condition to appear at the D or data input of flip flop 26 by virtue of the signal inversion through gate 27. When the next $\overline{Q}3$ signal from Counter 23 appears at the clock input to flip flop 26, it causes the flip flop to shift state to generate a high on the Q output terminal and thereby cause a high to arise on the A2 line. This corresponds to the condition shown in FIG. 4 on the A2 timing line.

The next $\overline{Q}3$ pulse from Counter 23 again shifts the flip flop 25 to its Q state and causes a high to appear on Multiplexer timing line A1 as shown in FIG. 4, but the A2 signal from the Q output of flip flop 26 remains because the data input D to flip flop 26 was at a low condition thereby preventing the $\overline{Q}3$ signal from Counter 23 from shifting the state of the flip flop 26. Accordingly, both the A1 and A2 lines of the Multiplexer are high corresponding to a three count, so that line finder group busy signal line 3 is connected through the Multiplexer to the output line 16 and has its signal state sampled by the strobe pulse, and these highs through the gating arrangement of gates 29, 30 and 31 cause the data input D of flip flop 27 to be in a high state so that the clock pulse input of flip flop 27 is enabled to shift the flip flop from $\overline{Q}$ to a Q state upon receipt of the next $\overline{Q}3$ pulse from Counter 23.

The next pulse from Counter 23 causes flip flops 25 and 26 both to go low at the Q outputs thereby suppressing the A1 and A2 Multiplexer signals, while at the same time the A3 Mutliplexer selector line goes high as shown in FIG. 4. Additional clock pulses from the $\overline{Q}3$ output of Counter 23 cause the flip flops 25, 26 and 27 to generate the successive signals as shown in the timing waveforms for Multiplexer selector lines A1, A2 and A3 as shown in FIG. 4, so that the Mutliplexer is caused to sequentially sample each of the six input lines to it corresponding to line finder group busy signal leads 0 through 5.

Referring now to FIG. 4, assume that the conditions on the line finder group busy signal lines 0 through 3 are as shown on the waveforms of FIG. 4. The signals shown at the Multiplexer output line 16 occur in the following fashion. When all three multiplexer timing lines A1, A2 and A3 were low during zero time, the input line designated at zero is examined by the Multiplexer 13, this line corresponding to line finder group busy signal lead zero LFB0 as shown in FIG. 1. Since the signal condition on line finder group busy signal zero line is low as shown in FIG. 4, the output signal on Multiplexer output line 16 is accordingly also low. Thereafter when timing line A1 goes high and timing lines A2 and A3 remain low, corresponding to selection of line finder group busy signal line 1, a low condition again appears at the Multiplexer output line 16 because the signal condition on line finder group busy signal line 1 is also low.

At this time it will be noted that the signal on line finder group busy signal lead 3 is high designating a busy condition. However, since the Multiplexer is not at this time examining the condition on line finder group busy signal line 3, the condition thereon is not presented at the Multiplexer output line 16. A similar situation arises when Multiplexer line 2 is examined for the condition on line finder group busy signal lead 2, the signal condition on that line being low so that a low is again the signal state on multiplexer output line 16, although both line finder group busy signal lines 0 and 3 are high at that time. Immediately thereafter when multiplexer line 3 is examined, corresponding to line finder group busy signal line 3, it is observed that the signal condition on line finder group busy signal line 3 is high so that an output pulse designated as LFB3 appears on Multiplexer output line 16 when the strobe pulse goes low, the LFB3 signal corresponding in duration to the low timing portion of the strobe pulse but being of inverted polarity. This of course assumes that the LFB3 signal persists for the entire width of the strobe pulse, but if it were to terminate prior to the end of the strobe pulse low level, of course the LFB3 signal shown on Multiplexer output line 16 would also terminate sooner.

The Timing And Line Address generator 14 next generates selection pulses on timing lines A1, A2 and A3 corresponding successively to the selection of lines 4 and 5, but since these lines are not in use because switches 12E and 12F of Line Selector 10 are open, only a low output condition can appear on Multiplexer output line 16 during the time intervals when lines 4 and 5 are selected by the Multiplexer. After examination of line 5, the counting cycle on Multiplexer timing lines A1, A2 and A3 starts into a second cycle and thereafter continues cycling continuously to examine in succession the sequence of input lines 0 through 5 and causes the conditions existing on the examined lines to appear on Multiplexer output line 16 during the appropriate time intervals. Accordingly, during the second scanning sequence an LFB0 signal appears during zero time and no other signals appear because at the time that each of the other lines is examined its signal condition is low. During the third scanning cycle, an LFB0 and LFB1 signal are generated, and so on for the fourth and fifth scanning sequences.

These LFB signals on Multiplexer output line 16 after passing through Noise Integrator 17 pass to Divide By N Counter 19, the logic of which is illustrated in FIG. 3 to which attention should be now directed. The Divide By N Counter 19 as shown in FIG. 3 is a multi-stage ring counter known as a Johnson Counter, and is described in detail in the application notes appearing on pages 415 through 420 of the RCA Solid State 1974 Data Book Series SSD-203B. The illustrated circuitry utilizes RCA integrated circuit type CD 4018 designated as Counter 32 in FIG. 3. As shown, the inputs illustrated are a clock input C, a reset input R, a data input D and three outputs stages $\overline{Q}1$, $\overline{Q}2$, and $\overline{Q}3$.

The Multiplexer output signal line 16 is connected through the Noise Integrator 17 by line 18 to the clock input C of the Counter 32 and to one input of "nand" gate 33. The output of "nand" gate 33 is connected to "or" gate 34 which latter also receives as an input thereto the output of "nand" gate 35. One input to "nand" gate 35 is the output of inverter 36 which has its input connected to output $\overline{Q}1$ of Counter 32, the same output $\overline{Q}1$ being also connected as an input to "nand" gate 37 and being connected to one terminal of a switch 38B. The other input to "nand" gate 35 is received as the output of inverter 39, the input of which is the output of another inverter 40 which has its input connected to the pole of the switch 38A and to one end of a resistor 41. The output of inverter 40 is connected as a second input to "nand" gate 33 while the contact of switch 38A is connected to ground.

The $\overline{Q}2$ output of Counter 32 is connected as one input to "nand" gate 37, as one input to "nand" gate 42 and to one pole of switch 38D. The $\overline{Q}3$ output of Counter 32 is connected as one input to "nand" gate 42 and is connected to the contact of switch 38F. The output of "nand" gate 37 is connected through an inverter 43 to the contact of switch 38C while the output of "nand" gate 42 is connected through an inverter 44 to the contact of switch 38E. All of the poles of switches 38B through 38F are strapped together and returned to the data input D of Counter 32.

The Counter 32 physically is capable of being connected as a five stage ring counter, but since only six lines are being monitored, only three of the five stages are actually employed as a three stage ring counter. The switches 38A through 38F establish the recirculation or feedback pulse which determines the effective size of the ring so that the counts can be set directly for the even counts of 2, 4 or 6 by switches 38B, 38D and 38F, or the odd count numbers are accomplished by utilization of the "nand" gate arrangements utilizing gates 37 and 42 together with switches 38C and 38E. When switch 38A is utilized, the Counter 32 is bypassed altogether and each pulse received appears on the output line as an output pulse.

More particularly, if switch 38A is closed the Divide By N Counter functions as a divide by one Counter, if the switch 38B is closed it functions as a divide by two Counter, and so on up to closure of switch 38F causing the counter to function as a divide by six Counter. In the illustrated case, switch 38D is closed so that Counter 19 functions as a divide by four Counter corresponding to the fact that line finder groups busy signal lines zero through three are being utilized, or a total of four lines, while line finder groups busy lines 4 and 5 are not utilized. Consequently, since four lines are being examined, and it is desired to find the average busy condition for those four lines, this average will be determined by taking the data for all four lines and dividing by four.

The Counter functions generally as follows. When switch 38A is closed, the input to inverter 40 is forced low so that its output is jammed to a high condition which high appears as one input to "nand" gate 33. This same high output from inverter 40 appears at the output of inverter 39 as a low and therefore disables "nand" gate 35. With "nand" gate 33 enabled, every pulse on Multiplexer output line 16 is passed via line 18 to "nand" gate 33 and therethrough to one input of negative "or" gate 34. Each such pulse passes through "or" gate 34 to line 20 and is of the same polarity as signals which are generated in the other counting modes via "nand" gates 35 as derived from the $\overline{Q}1$ output of Counter 32. These signals on line 20 then pass through the Output Level Shifter 21 as a final output signal.

If now the counter is desired to be set into the divide by four mode for example, as is illustrated in the switch arrangement of FIG. 3, switch 38D is closed as shown and all of the other switches are in their open condition. With switch 38A open, a high condition appears at the input to inverter 40, appearing at its output as a low, which low is presented as one input to "nand" gate 33 thereby disabling that gate so that the pulses which are presented to it from line 18 cannot pass therethrough. The low output from inverter 40 appears as a high output from inverter 39 and thereby conditions "nand" gate 35 to pass through any high signals which are applied to its other input from the output of inverter 36. Accordingly, whenever the input of inverter 36 goes low, corresponding to the low state of counter output $\overline{Q}1$, an output signal will be generated on line 20. Since the divide by four condition is set into the Counter by closure of switch 38D, the $\overline{Q}3$ output is not used at all, and the only waveforms shown in FIG. 4 for the divide by four Counter are the outputs from the $\overline{Q}1$ and $\overline{Q}2$ terminals.

Referring now to the $\overline{Q}1$ and $\overline{Q}2$ waveforms in conjunction with the signals appearing on the Multiplexer output line 16/18 immediately thereabove, it is observed that the appearance of the LFB3 pulse on output line 16/18 is presented as the first pulse to the clock input of Counter 32 thereby causing the Q1 counter to have its $\overline{Q}1$ terminal shifted from a high to a low condition and commencing the generation of an output signal. The logic of the counter is such that on the first counting cycle, a count will be produced as soon as a count in excess of one-half of the divisor is achieved, so that in the present case as soon as a count of three has been attained, the first COUNT will occur by terminating the generation of the output signal. Thereafter, each additional COUNT will occur upon the count of four additional pulses.

With $\overline{Q}1$ in its low state, the next pulse which is received, which is the LFB0 pulse during the second scanning cycle, causes $\overline{Q}2$ to go low therefore recirculating a low signal condition through closed switch 38D around to the counter data input D. This low signal received at data input D conditions the Q1 stage so that upon receipt of the next pulse at the clock input C, $\overline{Q}1$ will be again driven high. Accordingly, when the LFB0 pulse in the third scanning sequence occurs on line 16/18, $\overline{Q}1$ is again driven high, producing a low at the output of inverter 36 so that the signal on line 20 terminates. This $\overline{Q}1$ termination is designated as COUNT, and this will be subsequently explained. This sequence now continues repetitively so that the immediately succeeding LFB1 pulse on line 16 received at the clock input of counter 32 causes the second stage $\overline{Q}2$ output to be switched from its low to its high state. The LFB1 pulse on Multiplexer output line 16 was the first pulse of the group of four which must be received by Counter 32 before a second output signal is generated, and this is seen to be so because it requires the receipt of the next LFB0 pulse to shift $\overline{Q}1$ output to its low condition followed by the next successive LFB1 and LFB2 pulses before the $\overline{Q}1$ output again goes from its low to its high state signalling another COUNT condition. Accordingly, the Counter is now operating in a cycle where the $\overline{Q}1$ COUNT signal is generated upon the counting of four input signals on Multiplexer output line 16.

If a divide-by-five or divide-by-six condition is required by virtue of the fact that more than four of the line finder group busy signal input lines are being monitored, then the Q3 stage of Counter 32 will be brought into operation by closure of either the switch 38E or switch 38F to determine how many counts will be required before a recirculating signal is routed back to the data input D of Counter 32 to condition the Q1 stage to assume its low signal state.

The output signal from the apparatus according to this invention may be inserted as one of a plurality of input signals to the apparatus described in U.S. Pat. No. 3,868,480 dated Feb. 25, 1975 to Joseph M. Murgio et al., assigned to the assignee of the present invention. The Murgio et al apparatus examines all input signals on a time division multiplexed basis, and "counts" the receipt of a signal only when an input signal line shows data present for two or more consecutive scan cycles followed by a showing of data absent for two consecutive scan cycles. Since a scan cycle is only 12 milliseconds it will be clear from FIG. 4 that a COUNT condition occurs between approximately 12 and 24 milliseconds after the Q1 output signal goes high. Other COUNT indicators could of course also be used, such as a positive polarity differentiator or a Schmitt trigger.

Having now described our invention in connection with a particularly illustrated embodiment thereof, it will be understood that modifications and variations of our invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. Apparatus for monitoring the signal states on a plurality of independent signal lines and for generating signals which indicate the average condition of the signal state on all of the monitored lines, comprising in combination,
  a. parallel to serial electrical signal input multiplexer means having a plurality of independent input circuits adapted for connection to a plurality of independent input signal lines, and having an output circuit, said multiplexer means being operative to sample on a time sequential repetitive basis the signal condition on each of said input circuits and to produce at its output circuit an intermediate signal whenever a sampled input circuit is characterized by a first signal state and to produce no intermediate signal when a sampled input circuit is not characterized by said first signal state,
  b. line selection means for selecting for monitoring any number of the plurality of independent signal lines and for connecting the same to selected ones of said multiplexer means plurality of independent input circuits, and
  c. counter means having an input circuit operatively coupled to said multiplexer means output circuit to receive intermediate signals from the latter, having an output circuit, and having count selection means effective to set the counter to count a number of intermediate signals from said multiplexer equal to the number of independent signal lines selected for monitoring by said line selection means and operative to thereupon generate an output count signal at its output circuit whereby, an output count signal can occur at most once during each multiplexer scan time so that an average condition of the signal state on all of the monitored lines is obtained from the number of output count signals which occur during any particular time interval.

2. Apparatus as set forth in claim 1 further including noise suppression means interposing said multiplexer means output circuit and said counter means input circuit.

3. Apparatus as set forth in claim 1 wherein said line selection means comprises switch means interposing said multiplexer means independent input circuits and said plurality of independent signal lines.

4. Apparatus as set forth in claim 1 wherein said line selection means comprises a plurality of independently operable switches with discrete switches of said plurality interconnecting discrete circuit pairs each of which is respectively composed of a different one of said multiplexer input circuits and a different one of said independent signal lines.

5. Apparatus as set forth in claim 1 wherein said counter means is a multi-stage ring counter, and said count selection means comprises switch means effective to respectively expand and contract the ring by increasing and decreasing the number of stages in the ring.

* * * * *